(12) United States Patent
Slocum et al.

(10) Patent No.: US 11,958,585 B1
(45) Date of Patent: Apr. 16, 2024

(54) MIDAIR DEPLOYMENT OF AEROSTATS

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 17/535,008

(22) Filed: Nov. 24, 2021

Related U.S. Application Data (60) Provisional application No. 63/118,255, filed on Nov. 25, 2020.

(51) Int. Cl.
*B64D 1/12* (2006.01)
*B64B 1/62* (2006.01)

(52) U.S. Cl.
CPC . *B64B 1/62* (2013.01); *B64D 1/12* (2013.01)

(58) Field of Classification Search
CPC ................................... B64D 1/12; B64B 1/62
See application file for complete search history.

(56) References Cited

U.S. PATENT DOCUMENTS

| | | |
|---|---|---|
| 3,204,320 A | 9/1965 | Eckstein et al. |
| 3,381,655 A | 5/1968 | Rozzelle |
| 3,993,595 A | 11/1976 | Merkl |
| 4,134,491 A | 1/1979 | Turillon et al. |
| 4,264,018 A | 4/1981 | Warren |
| 4,280,288 A | 7/1981 | Corfa et al. |
| 4,358,291 A | 11/1982 | Cuomo et al. |
| 4,446,636 A | 5/1984 | Weinert |
| 4,586,456 A | 5/1986 | Forward |
| 4,770,848 A | 9/1988 | Ghosh et al. |
| 5,240,449 A | 8/1993 | Sloan et al. |
| 5,301,631 A | 4/1994 | Vining |
| 5,372,617 A | 12/1994 | Kerrebrock et al. |
| 5,555,839 A | 9/1996 | Staten et al. |
| 5,620,652 A | 4/1997 | Tack et al. |

(Continued)

FOREIGN PATENT DOCUMENTS

| | | |
|---|---|---|
| CN | 204034673 U | 12/2014 |
| GB | 2356184 A | 5/2001 |

(Continued)

OTHER PUBLICATIONS

USPTO; U.S. Appl. No. 17/475,320, Notice of Allowance dated Mar. 9, 2022; 24 pages.

(Continued)

*Primary Examiner* — Tye William Abell
(74) *Attorney, Agent, or Firm* — The Marbury Law Group, PLLC (57) ABSTRACT

According to one aspect, a system for midair deployment of an aerostat may include an inflatable structure including a balloon at least partially defining a volume, a reaction vessel defining a chamber in fluid communication with the volume, a fuel package disposed in the chamber, the fuel package including a container and water-reactive aluminum, the container fluidically isolating the water-reactive aluminum from an environment of the chamber, and an actuator actuatable to release the water-reactive aluminum from the container into the environment of the chamber.

16 Claims, 6 Drawing Sheets

(56) References Cited

U.S. PATENT DOCUMENTS

| | | |
|---|---|---|
| 5,707,499 A | 1/1998 | Joshi et al. |
| 5,732,752 A | 3/1998 | Glessner et al. |
| 6,386,137 B1 | 5/2002 | Riche |
| 6,506,360 B1 | 1/2003 | Andersen et al. |
| 6,648,272 B1 | 11/2003 | Kothmann |
| 7,503,277 B2 | 3/2009 | Boschma, Jr. et al. |
| 7,803,349 B1 | 9/2010 | Muradov |
| 8,157,205 B2 | 4/2012 | McWhirk |
| 8,418,435 B2 | 4/2013 | Hatoum |
| 8,430,704 B2 | 4/2013 | Jeffrey |
| 8,697,027 B2 | 4/2014 | Uzhinsky et al. |
| 8,864,064 B2 | 10/2014 | DiMarzio et al. |
| 8,974,765 B2 | 3/2015 | Boyle et al. |
| 9,174,140 B2 | 11/2015 | Nelson et al. |
| 9,346,532 B1 | 5/2016 | Ratner |
| 9,511,844 B1 | 12/2016 | DeVaul |
| 9,619,977 B2 | 4/2017 | Graham et al. |
| 9,624,103 B1 | 4/2017 | Woodall et al. |
| 9,853,360 B2 | 12/2017 | Sylvia et al. |
| 9,902,480 B1 | 2/2018 | Cromie et al. |
| 10,113,534 B2 | 10/2018 | Sia |
| 10,737,754 B1 | 8/2020 | Farley et al. |
| 10,745,789 B2 | 8/2020 | Slocum |
| 10,829,192 B1 | 11/2020 | Farley et al. |
| 10,829,229 B2 | 11/2020 | MacCallum et al. |
| 10,988,227 B2 | 4/2021 | MacCallum et al. |
| 11,130,557 B1 | 9/2021 | Slocum et al. |
| 11,141,671 B2 | 10/2021 | Harter et al. |
| 11,142,318 B2 | 10/2021 | Thrun et al. |
| 11,203,430 B2 | 12/2021 | Heppe |
| 11,312,466 B1 | 4/2022 | Slocum et al. |
| 11,318,437 B1 | 5/2022 | Slocum et al. |
| 11,661,339 B1 | 5/2023 | Slocum et al. |
| 2002/0088178 A1 | 7/2002 | Davis |
| 2003/0024323 A1 | 2/2003 | Wang et al. |
| 2003/0062444 A1 | 4/2003 | Goodey |
| 2007/0057116 A1 | 3/2007 | Sinsabaugh et al. |
| 2007/0217972 A1 | 9/2007 | Greenberg et al. |
| 2008/0063597 A1 | 3/2008 | Woodall et al. |
| 2008/0193806 A1 | 8/2008 | Kulakov |
| 2009/0208404 A1 | 8/2009 | Itoh |
| 2010/0028255 A1 | 2/2010 | Hatoum |
| 2010/0112396 A1 | 5/2010 | Goldstein |
| 2010/0230121 A1 | 9/2010 | Hall et al. |
| 2012/0052001 A1 | 3/2012 | Woodall et al. |
| 2012/0100443 A1 | 4/2012 | Braithwaite et al. |
| 2012/0107228 A1 | 5/2012 | Ishida et al. |
| 2012/0318660 A1 | 12/2012 | Cohly et al. |
| 2014/0097289 A1 | 4/2014 | Heppe |
| 2014/0261132 A1 | 9/2014 | Zeren et al. |
| 2015/0204486 A1 | 7/2015 | Hoffmann |
| 2015/0258298 A1 | 9/2015 | Satoh et al. |
| 2016/0207605 A1 | 7/2016 | Jensen et al. |
| 2016/0257415 A1 | 9/2016 | Ye et al. |
| 2016/0355918 A1 | 12/2016 | Slocum |
| 2017/0022075 A1 | 1/2017 | Ritchie et al. |
| 2017/0022078 A1 | 1/2017 | Fukuoka |
| 2017/0355462 A1* | 12/2017 | Hoheisel .................. B64B 1/64 |
| 2018/0237141 A1 | 8/2018 | Heppe |
| 2019/0024216 A1 | 1/2019 | Giri et al. |
| 2019/0077510 A1 | 3/2019 | Panas et al. |
| 2019/0079509 A1 | 3/2019 | Bosworth |
| 2019/0341637 A1 | 11/2019 | Fine et al. |
| 2020/0199727 A1 | 6/2020 | Slocum |
| 2020/0199728 A1 | 6/2020 | Slocum |
| 2020/0262536 A1 | 8/2020 | Deakin |
| 2021/0061488 A1 | 3/2021 | Smithers et al. |
| 2021/0115547 A1 | 4/2021 | Slocum |
| 2021/0237843 A1 | 8/2021 | Slocum et al. |
| 2021/0276866 A1 | 9/2021 | Meroueh |
| 2022/0041262 A1 | 2/2022 | Slocum et al. |

FOREIGN PATENT DOCUMENTS

| | | |
|---|---|---|
| JP | 2004174301 A | 6/2004 |
| JP | 2004243151 A | 9/2004 |
| WO | 2009034479 A | 3/2009 |
| WO | 2015005921 A1 | 1/2015 |
| WO | 20150077225 A1 | 5/2015 |
| WO | 2016196718 A1 | 12/2016 |
| WO | 202134805 A1 | 2/2021 |
| WO | 2021119628 A1 | 6/2021 |

OTHER PUBLICATIONS

Godart, P.; "Design of an Aluminum-Powered Reverse Osmosis Desalination System for Disaster Relief"; Massachusetts Institute of Technology Jun. 2019; Dept. of Mechanical Engineering; May 22, 2019; 105 pages.

Godart, P.; "Mechanisms of Liquid-Metal-Activated Aluminum-Water Reactions and the Application"; Massachusetts Institute of Technology Sep. 2021; Dept. of Mechanical Engineering; Aug. 6, 2021; 351 pages.

Can Dimensions, Twin Monkeys Beverage Canning Systems, 3 pages; retrieved on Apr. 5, 2021; https://twinmonkeys.net/can-dimensions/.

Lauren Meroueh "Effects of Doping and Microstructural Variables on Hydrogen Generated via Aluminum-Water Reactions Enabled by a Liquid Metal", Massachusetts Institute of Technology (MIT), Department of Mechanical Engineering, Sep. 2020, 127 pages.

Chao et al., "Mazimized On-Demand Hydrogen Genertor Design", Adv. Mat.Res. V 690-693. pp 954-961 (2013).

EPO, "EP Application Serial No. 16804381.8, Extended European Search Report dated Oct. 26, 2018", 7 pages.

WIPO, "PCT Application No. PCT/US16/35397, International Preliminary Reporton Patentability dated Dec. 5, 2017", 11 pages.

ISA, "PCT Application No. PCT/US16/35397, International Search Report and Written Opinion dated Sep. 7, 2016", 13 pages.

USPTO; U.S. Appl. No. 17/177,144, Notice of Allowance dated Jul. 21, 2021, 14 pages.

USPTO; U.S. Appl. No. 17/177,144, Non-Final Office Action dated Apr. 12, 2021, 35 pages.

USPTO; U.S. Appl. No. 17/340,769, Non-Final Office Action dated Aug. 11, 2021, 11 pages.

USPTO; U.S. Appl. No. 17/014,593, Notice of Allowance dated Jun. 3, 2021, 15 pages.

USPTO; U.S. Appl. No. 17/014,593, Notice of Allowance dated Jan. 22, 2021, 19 pages.

USPTO; U.S. Appl. No. 16/804,676, Non-Final Office Action dated Jul. 21, 2021, 17 pages.

USPTO; U.S. Appl. No. 16/804,643, Non-Final Office Action dated Apr. 15, 2021. 22 pages.

USPTO, U.S. Appl. No. 16/804,676, Notice of Allowance dated Jan. 25, 2022; 25 pages.

Wikipedia, "USS Macon (ZRS-5)", 10 pages, (Feb. 24, 2023).

United States Patent and Trademark Office, "Notice of Allowance and Fee(s) Due," issued in related U.S. Appl. No. 17/701,915 dated May 26, 2023 (9 pages).

United States Patent and Trademark Office, "Notice of Allowance and Fee(s) Due," issued in related U.S. Appl. No. 17/586,759 dated May 24, 2023 (26 pages).

* cited by examiner

MIDAIR DEPLOYMENT OF AEROSTATS

CROSS-REFERENCE TO RELATED APPLICATIONS

This application claims priority to U.S. Provisional Application Ser. No. 63/118,255, filed Nov. 25, 2020, the entire contents of which are hereby incorporated herein by reference.

CROSS-REFERENCE TO RELATED APPLICATIONS

This invention was made with government support under FA8702-15-D-0001 awarded by the United States Air Force. The government has certain rights in the invention.

BACKGROUND

Balloons can be filled with a lifting gas to allow the balloon to float in any one or more of various different media. As an example, balloons in the form of weather balloons are commonly used for meteorological observation of localized conditions that may not be accurately measurable using ground-based measurements or satellite images. The time and equipment required to inflated balloons, however, can limit the types of applications in which balloons may be used.

There remains a need for filling balloons rapidly, using equipment that may be amenable to transportation and storage across a variety of field conditions.

SUMMARY

According to one aspect, a system for midair deployment of an aerostat may include an inflatable structure including a balloon at least partially defining a volume, a reaction vessel defining a chamber in fluid communication with the volume, a fuel package disposed in the chamber, the fuel package including a container and water-reactive aluminum, the container fluidically isolating the water-reactive aluminum from an environment of the chamber, and an actuator actuatable to release the water-reactive aluminum from the container into the environment of the chamber.

In certain implementations, the water-reactive aluminum may include sand-sized particles. For example, the sand-sized particles may have a particle size distribution with a predetermined lower threshold and a predetermined upper threshold. As a specific example, the predetermined lower threshold may be 0.07 mm, and the predetermined upper threshold may be 2 mm.

In some implementations, the reaction vessel may define a port in fluid communication with the chamber. The fuel package may be introducible into the chamber via the port.

In certain implementations, at least a portion of the container may be pierceable, via actuation of the actuator, to release the water-reactive aluminum from the container and into the environment of the chamber.

In some implementations, at least a portion of the container may be meltable, via actuation of the actuator, to release the water-reactive aluminum from the container and into the environment of the chamber.

In certain implementations, the system may further include a disengagement mechanism disposed between the reaction vessel and the inflatable structure. Further, or instead, the inflatable structure may include a bistable valve. The disengagement mechanism may be actuatable to separate the inflatable structure from the reaction vessel, and the bistable valve may be movable to seal the volume of the balloon in coordination with actuation of the disengagement mechanism. In some instances, at least a portion of the reaction vessel may be open following separation of the reaction vessel from the inflatable structure.

According to another aspect, a controller for midair deployment of an aerostat may include a processing unit, and one or more non-transitory computer storage media in electrical communication with the processing unit, the one or more non-transitory computer storage media having stored thereon instructions that, when executed by the processing unit, cause the processing unit to carry out operations including sending a first actuation signal to an actuator coupled to a container, disposed in a chamber defined by a reaction vessel, to release water-reactive aluminum from within the container into an environment of the chamber, and sending a second actuation signal to a disengagement mechanism to release the reaction vessel from an inflatable structure including a balloon at least partially defining a volume in fluid communication with the chamber of the reaction vessel.

In some implementations, the instructions may further include instructions that, when executed by the processing unit, cause the processing unit to carry out operations including receiving a user input signal from a remote user interface, wherein at least one of sending the first actuation signal or sending the second actuation signal is based on the user input signal received from the remote user interface.

In certain implementations, the instructions may further include instructions that, when executed by the processing unit, cause the processing unit to carry out operations including receiving a sensor signal, wherein the sensor signal is indicative of altitude of the inflatable structure, wherein sending the second actuation signal to release the disengagement mechanism is based on the sensor signal. As an example, receiving the sensor signal may include determining buoyancy of the inflatable structure, and sending the second actuation signal to release the disengagement mechanism when the buoyancy of the inflatable structure is neutral or positive.

According to another aspect, a method of deploying an aerostat in midair may include launching, from an aircraft in flight, an inflatable structure coupled to a reaction vessel, in a chamber defined by the reaction vessel, releasing fluidic isolation between water-reactive aluminum and water in the chamber to generate a hydrogen-containing lifting gas, directing the hydrogen-containing lifting gas from the chamber into a volume at least partially defined by a balloon of the inflatable structure, and, with the hydrogen-containing lifting gas at least partially filling the volume of the balloon to provide buoyancy, detaching the inflatable structure from the reaction vessel.

In certain implementations, launching the inflatable structure and the reaction vessel from the aircraft in flight may include dropping the inflatable structure and the reaction vessel into freefall from the aircraft.

In some implementations, releasing fluidic isolation between the water-reactive aluminum and the water may be based on altitude of the inflatable structure and the reaction vessel.

In some implementations, releasing fluidic isolation between the water-reactive aluminum and the water in the chamber may be based on a predetermined time following launch of the inflatable structure and the reaction vessel from the aircraft.

In certain implementations, releasing fluidic isolation between the water-reactive aluminum and the water in the chamber may be based on a remote signal from a user.

In certain implementations releasing fluidic isolation between the water-reactive aluminum and the water in the chamber is based on buoyancy of the inflatable structure.

BRIEF DESCRIPTION OF THE FIGURES

Like reference symbols in the various drawings indicate like elements.

DETAILED DESCRIPTION

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the description that follows, devices, systems, and methods for midair deployment of aerostats are generally described. As used herein, the term "aerostat" shall be understood to include any one or more of various different types of lighter-than-air aircraft that gain lift primarily from aerostatic lift, in contrast to aerodynes that primarily make use of aerodynamic lift requiring movement of a wing surface through air. In use cases described herein, an aerostat may contain a quantity of lifting gas such that the average density of the aerostat (containing the quantity of lifting gas) is less than or equal to the density of air at some altitude and, thus, the aerostat is at least neutrally buoyant in air for a period of time. Unmanned and unpowered aerostats are an important application for lifting gas and serve as useful examples for highlighting particular aspects of the devices, systems, and methods of the present disclosure. However, unless otherwise specified or made clear from the context, the term "aerostat" shall be understood to include any manner and form of object that can receive lifting gas to have at least some degree of buoyancy in air, whether in an indoor or an outdoor environment. In use, such aerostats may be used to make observations (e.g., about weather in the atmosphere, conditions of terrain below the aerostat), carry passengers and/or cargo, broadcast and/or receive signals beyond the aerostat, collect data, lift structures from lower altitudes, or serve as decorations. Accordingly, as used herein, an aerostat may include any one or more of various different manned or unmanned craft, dirigible or non-dirigible craft, independently propelled or floating craft, rigid or nonrigid craft, tethered or untethered craft, or combinations thereof.

As used herein, the term "inflatable structure" shall be understood to include a balloon at least partially defining a volume that may be filled with lifting gas. Thus, as used herein, an inflatable structure shall be understood to have an uninflated state and an inflated state, with the difference between the two states being whether the volume of the balloon of the inflatable structure contains a quantity of lifting gas that imparts at least neutral buoyancy to the inflatable structure in air. For the sake of consistent terminology and clear description, the term "aerostat" is herein reserved for reference to an inflatable structure in an inflated state such that the aerostat may float in air for some period of time. That is, in the examples described below, an inflatable structure is not initially buoyant (and, thus, not an aerostat). The inflatable structure shall be understood to become an aerostat once the inflatable structure is made at least neutrally buoyant by lifting gas introduced to the lifting structure according to the various different techniques described herein. Thus, unless otherwise indicated, the term "aerostat" shall be understood to be interchangeable with the phrase "inflatable structure in an inflated state" or variants thereof.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

Figure 1:
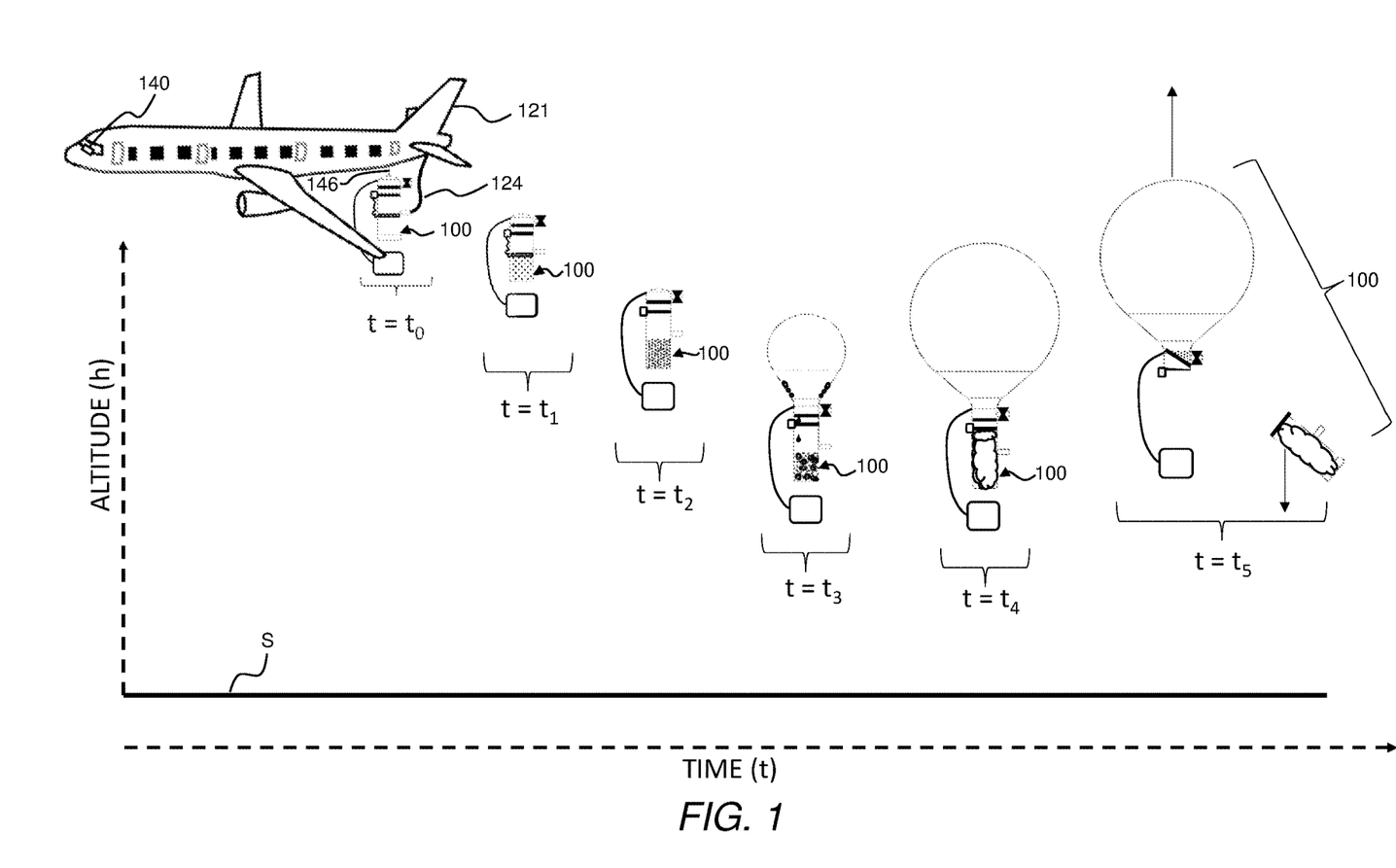
FIG. 1 is a schematic representation of a temporal sequence of operation of a system for midair deployment of an aerostat, with the system initially launched (at $t=t_0$) from an aircraft in flight.
Figure 2A:
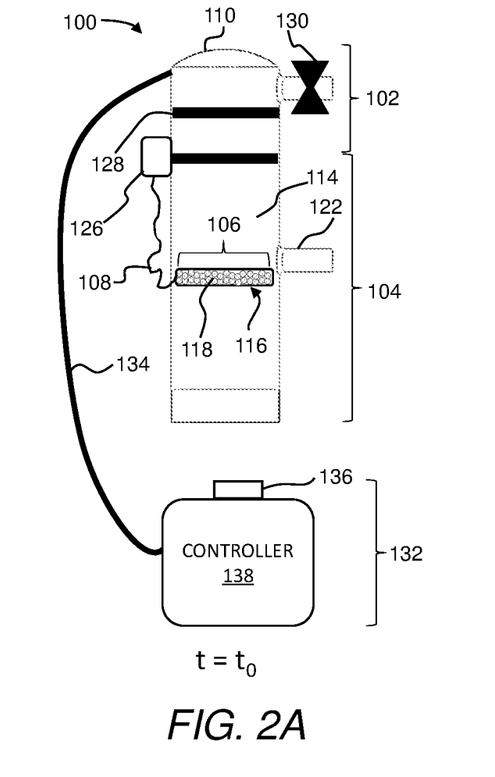
FIG. 2A is an enlarged view of the system of FIG. 1, shown at an initial time step ($t=t_0$) in which water-reactive aluminum in a container is fluidically isolated from an environment of a chamber defined by a reaction vessel of the system.

Referring now to FIGS. 1 and 2A, a system 100 may include an inflatable structure 102, a reaction vessel 104, a fuel package 106, and an actuator 108. The inflatable structure 102 may include a balloon 110 at least partially defining a volume 112, and the reaction vessel 104 may define a chamber 114 in fluid communication with the volume 112. The fuel package 106 may be disposed adjacent (e.g., in or next to) the chamber 114. The fuel package 106 may include, for example, a container 116 and water-reactive aluminum 118, with the container 116 fluidically isolating the water-reactive aluminum 118 from an environment of the chamber 114. The actuator 108 may be actuatable to release the water-reactive aluminum 118 from the container 116 into the environment of the chamber 114. As described in greater detail below, through actuation of the actuator 108, the water-reactive aluminum 118 may be released from the container 116 into water at least partially filling the chamber 114 to produce hydrogen-containing gas for inflating the inflatable structure 102 into an aerostat. Thus, as compared to manually combining water-reactive aluminum with water to produce hydrogen-containing gas, actuation of the actuator 108 to release the water-reactive aluminum 118 from the container 116 may facilitate initiating the production of hydrogen-containing gas (and heat) as the system 100 is in midair, away from a launching aircraft. For example, this may be advantageous for reducing the potential for unintended interaction (e.g., entanglement) between the system 100 and the launching aircraft and/or for reducing a likelihood of detection of the launching aircraft.

In use, as described in greater detail below, the system 100 may be transportable by an aircraft 121 (e.g., any one or more of various different types of aerodynes or aerostats) to an altitude above a ground surface S, where the system 100 may be launched from the aircraft 121. As described in greater detail below, as the system 100 falls away from the aircraft 121 under the force of gravity, water-reactive aluminum and water may in the reaction vessel 104 to produce hydrogen-containing gas. Importantly, the hydrogen-containing gas may be formed in the reaction vessel 104 and moved into the inflatable structure 102 to impart neutral or positive buoyancy to the inflatable structure 102 before the system 100, falling from the aircraft 105, can reach the ground surface S. Stated differently, the hydrogen-containing gas may be formed rapidly in the reaction vessel 104 to facilitate midair inflation of the inflatable structure 102 into an aerostat having neutral or positive buoyancy in air for at least some period of time. As compared to ground-launched aerostats, the midair inflation of the inflatable structure 102 into an aerostat according to the various different techniques described herein may facilitate more widespread deployment of floating systems (e.g., for providing internet access, weather observation, reconnaissance, etc.) in remote areas that are not easily reached by ground. Further, in windy conditions, ground-launched aerostats can become pinched, increasing the potential for material failure and/or increasing time required for inflation of ground-launched aerostats. Thus, the midair inflatability of the inflatable structure 102 into an aerostat according to the techniques described herein may facilitate deploying aerostats independently of ground conditions, particularly ground conditions that are inhospitable to deploying ground-launched aerostats.

In general, the container 116 of the fuel package 106 may be generally robust and water-tight to reduce the likelihood of premature reaction of the water-reactive aluminum 118 in the container 116 (e.g., during handling and/or during launch from the aircraft 121). As an example, the container 116 may be formed as a thin-walled pouch enveloping the water-reactive aluminum 118. Further or instead, the container 116 may be flexible to withstand handling and preparation of the system 100 for launch. As a more specific example, therefore, the container 116 may be formed of one or more polymeric materials, which may be advantageously inexpensive, flexible, and impenetrable by water or contaminants.

Balanced against the foregoing aspects of robustness, the container 116 may nevertheless be reliably openable in midair to expose the water-reactive aluminum 118 to water in the chamber 114 just prior to or during freefall of the system 100 from the aircraft 121. That is, the container 116 may be reliably openable in midair to release the water-reactive aluminum 118 through mechanical and/or electrical actuation of the actuator 108 to direct energy to the container 116. For example, at least a portion of the container 116 may be pierceable and actuation of the actuator 108 may release the water-reactive aluminum 118 from the container 116 into the environment of the chamber 114, which may be at least partially filled with water, as described in greater detail below. Continuing with this example, the actuator 108 may be one or more of a blade or a razor wire actuatable to cut open the container 116 to release the water-reactive aluminum 118. As another example, at least a portion of the container 116 may be meltable (e.g., thermally weakened to release), via actuation of the actuator 108, to release the water-reactive aluminum from the container 116 and into the environment of the chamber 114 (e.g., into water in the chamber 114). As a more specific example, the actuator 108 may be a hot wire. Electrical energy directed to the actuator 108 may heat the actuator 108 to a temperature above a melt temperature of material of the container 116 such that the water-reactive aluminum 118 in the container 116 may be released into the environment of the chamber 114.

In general, the water-reactive aluminum 118 may be reactable with water in the chamber 114 to produce large quantities of hydrogen-containing gas rapidly and under a variety uncontrolled and/or unpredictable field conditions. As used in this context, rapid production of hydrogen-containing gas shall be understood to include production of hydrogen containing gas in less than an amount of time for the system 100 in freefall to reach the ground from an altitude (e.g., about 6000 m) typical of parachute deployment used to launch personnel and/or goods from aerodynes.

At such an altitude, rapid reaction of the water-reactive aluminum 118 with water in the chamber 114 shall be understood to include reaction of such reactants to completion (e.g., corresponding to a hydrogen yield of greater than 80 percent) in less than two minutes. Thus, for example, the water-reactive aluminum 118 may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference.

In certain implementations, the water-reactive aluminum 118 may be in the form factor useful for facilitating rapid reaction of the water-reactive aluminum 118 to produce hydrogen-containing gas, heat, and steam useful for mid-air inflation of the inflatable structure 102. For example, the water-reactive aluminum 118 may have a form factor crushed or ground from a larger-sized feedstock. As compared to the larger-sized feedstock, smaller pieces of the water-reactive aluminum 118 may have an increased surface area for initiating reaction with water and may float or suspend throughout water in the chamber 114 during reaction (e.g., as hydrogen-containing gas bubbles adhere to the small pieces of the water-reactive aluminum 118), thus facilitating rapid and complete reaction even in a limited volume of water.

As an example, the water-reactive aluminum 118 may have a form factor of sand-sized particles crushed or ground from larger-sized feedstock. As used herein, sand-sized particles shall be understood to be particles having an average particle size greater than 0.05 mm and less than 2.0 mm in the container 116. Further, sand-sized particles shall be understood to be distinguishable from powder-sized particles, which are more difficult to handle and can pose greater safety risks. In certain implementations, the water-reactive aluminum 118 in the form of sand-sized particles may have a particle size distribution with a predetermined lower threshold and a predetermined upper threshold. The predetermined lower threshold may be useful for reducing the likelihood that the size distribution of the water-reactive aluminum 118 contains powder in a quantity posing an explosivity hazard. Further, or instead, the predetermined upper threshold may be useful for increasing the likelihood that the particles of the water-reactive aluminum 118 may float or become suspended in water, thus facilitating rapid (e.g., less than one minute) and complete reaction of the water-reactive aluminum 118. As an example, the size distribution of the water-reactive aluminum 118 having the predetermined lower threshold and the predetermined upper threshold may be achieved by passing particles of the water-reactive aluminum 118 through appropriately sized screens. As a specific example, particles of the water-reactive aluminum 118 may be screened in a range from 2 mm diameter (10×10 screen) to 0.07 mm diameter (200×200 screen) such that the water-reactive aluminum 118 is in the form of sand-like particles having a size distribution that is cut-off at the lower end and at the higher end of the distribution.

In general, the reaction vessel 104 may be formed of any one or more of various different materials that may withstand temperature and pressure changes associated with reaction of the water-reactive aluminum 118 in the chamber 114 to form hydrogen-containing gas, heat, and steam. In some instances, at least a portion of the reaction vessel 104 may be compliant to reduce the likelihood that excessive pressure will develop in the chamber 114 or other portions of the system 100 during the rapid reaction of the water-reactive aluminum 118 in water in the chamber 114. Thus, as a specific example, the reaction vessel 104 may be formed of latex and/or other similar materials at least along the chamber 114.

The reaction vessel 104 may, in some instances, define a port 122 in fluid communication with the chamber 114, as may be useful for loading one or more reactants into the chamber 114 prior to launching the system 100 from the aircraft 121. For example, the fuel package 106 may be introducible into the chamber 114 via the port 122. This may be useful, for example, for inspecting the fuel package 106 at or near the time of use of the system 100 to increase the likelihood that the fuel package 106 may properly release the water-reactive aluminum 118 upon actuation of the actuator 108. Additionally, or alternatively, water may be introduced into the chamber 114 through the port 122, such as through a hose 124 releasable from the port 122 following the introduction of water. Because the fuel package 106 is water-tight, reaction of the water-reactive aluminum 118 in the fuel package 106 with water in the chamber 114 will not begin until the water-reactive aluminum 118 is released from the fuel package 106. Thus, while the fuel package 106 may be supported in the chamber 114 away from water in the chamber 114, some use cases may include at least partially immersing the fuel package 106 in water in the chamber 114. Further, for the sake of clear and efficient description, the examples below generally describe introduction of water into the chamber 114, via the port 122, while the fuel package 106 is already positioned in the chamber 114. While this order of introduction of reactants may have certain advantages with respect to prepackaging and checking various aspects of the system 100 prior to use, it shall be understood that the order of introduction of the reactants may be reversed without departing from the scope of the present disclosure. That is, in some implementations, water may first be added to the chamber 114 via the port 122, and then the fuel package 106 may be moved through the port 122 and into the chamber 114 at least partially filled with water.

In general, the balloon 110 may be inflatable from a deflated state to an inflated state such that, as used herein, the inflation state of the balloon 110 may be understood to be interchangeable with the inflation state of the inflatable structure 102. In the deflated state, the balloon 110 itself may provide drag to the system 100 to freefall of the system 100 until the balloon 110 is inflated to the inflated state corresponding to the inflatable structure 102 having neutral or positive buoyancy in air. As an example, the balloon 110 may be spherical or parachute-shaped to facilitate providing drag. With the balloon 110 providing drag to slow freefall of the system 100, it shall be appreciated that the system 100 may be deployed from the aircraft 121 with no parachute or at least with a much smaller parachute than would otherwise be required to achieve a freefall time greater than a time associated with deploying the inflatable structure 102 as an aerostat.

In some implementations, the balloon 110 may include a hydrophobic coating at least along a portion of the balloon 110 defining the volume 112. As described in greater detail below, the hydrogen-containing gas generated in the chamber 114 and introduced into the volume 112 may contain moisture. As moisture in the volume 112 condenses on the hydrophobic coating of the balloon 110, the moisture may move (e.g., under the force of gravity) from the volume 112 back into the chamber 114, where the moisture may continue to react with unreacted portions of the water-reactive aluminum 118. Stated differently, the hydrophobic coating on the balloon 110 may facilitate efficient use of water in the reaction of the water-reactive aluminum 118 to produce hydrogen-containing gas, thus reducing the amount of water that must be transported to launch the system 100 and/or facilitating forming the system 100 with a compact form factor. Further, or instead, as described in greater detail below, the hydrophobic coating may facilitate collecting condensed moisture in the volume 112 when the inflatable structure 102 is in an inflated state corresponding to an aerostat and discarding the condensed moisture from the volume 112 to increase lifting efficiency of the inflatable structure 102 as an aerostat.

In certain implementations, the reaction vessel 104 and the balloon 110 may be made from the same or similar flexible materials (e.g., latex) such that the reaction vessel 104 and the balloon 110 form a monolithic structure. Such a monolithic structure may, for example, facilitate increasing drag to slow freefall of the system 100, as both the reaction vessel 104 and the balloon 110 may flex. Further, or instead, formation of the reaction vessel 104 and the balloon 110 as a monolith may increase the likelihood that hydrogen-containing gas generated in the chamber 114 may flow into the volume 112 of the balloon 110 to inflate the balloon 110. That is, the monolithic structure of the reaction vessel 104 and the balloon 110 may reduce the likelihood that leaks may develop between the reaction vessel 104 and the balloon 110 as the system 100 experiences stresses characteristic of freefall.

The system 100 may include a disengagement mechanism 126 in some instances. The disengagement mechanism 126 may be disposed between the reaction vessel 104 and the inflatable structure 102, and the disengagement mechanism 126 may be actuatable to separate the reaction vessel 104 and the inflatable structure 102 from one another (e.g., once the inflatable structure 102 is in the inflated state exhibiting neutral or positive buoyancy). The disengagement mechanism 126 may include any one or more of various different elements for reliably achieving complete separation of the reaction vessel 104 and the inflatable structure 102 from one another at uncontrolled and unpredictable conditions at altitude. For example, the disengagement mechanism 126 may be a blade, shear, or hot wire to cut or melt material to release the reaction vessel 104 from the inflatable structure 102 in the inflated state such that the inflatable structure 102 may float away (e.g., to a higher altitude) from the reaction vessel 104, and the reaction vessel 104 may fall to the ground. At least a portion of the reaction vessel 104 may be open following separation of the reaction vessel 104 from the inflatable structure 102. Continuing with this example, as the reaction vessel 104 falls away from the inflatable structure 102, reaction byproducts (which are nontoxic) in the chamber 114 of the reaction vessel 104 may be dispersed into the air to separate and fall to the ground, as may be useful for reducing or eliminating risk to property or people on the ground. As described in greater detail below, actuation of the disengagement mechanism 126 may be carried out in response to one or more of a user input or a signal from one or more sensors.

In instances in which the system 100 includes the disengagement mechanism 126, the inflatable structure 102 may include a bistable valve 128 movable to seal the volume 112 of the balloon 110 in coordination with actuation of the disengagement mechanism 126. That is, as the disengagement mechanism 126 releases the inflatable structure 102 from the reaction vessel 104, the bistable valve 128 may move from an open position to a closed position to seal the volume 112 of the balloon 110 and, in doing so, seal the hydrogen-containing gas within the balloon 110 such that the inflatable structure 102 may float for a period of time in air.

In some implementations, the inflatable structure 102 may include a drainage valve 130, which may be a float valve. As moisture in the hydrogen-containing gas condenses in the volume 112 of the balloon 110, the drainage valve 130 may be actuated to release liquid water from the inflatable structure 102. Such liquid water condensed in the volume 112 of the balloon 110 may advantageously provide ballast for the inflatable structure 102 in some conditions. However, because liquid water condensed in the volume 112 of the balloon 110 does not have any lifting capacity, actuating the drainage valve 130 to release the liquid water (e.g., when ballast is not needed) may advantageously reduce the overall weight to allow the inflatable structure 102 to facilitate allowing the inflatable structure 102 to rise to a higher altitude and/or to fly longer. Further, or instead, the drainage valve 130 may be actuated to allow some of the gas in the volume 112 of the balloon 110 to escape once the inflatable structure 102 has reached an appropriate altitude for a particular use case.

In some instances, the system 100 may additionally or alternatively include a payload 132 directly or indirectly mechanically coupled to the inflatable structure 102. For example, the payload 132 may be coupled to the inflatable structure 102 via a tether 134 such that the payload 132 may hang down from the inflatable structure 102 when the inflatable structure is in the inflated state and, thus, provide ballast to the inflatable structure 102. In general, the payload 132 may include any one or more various types of materials and/or equipment useful for carrying out a particular mission associated with deployment of the inflatable structure 102 as an aerostat. Such materials and equipment may include, among other things, sensing equipment for gathering weather data or observational information, information receiving and transmission equipment, or combinations thereof.

In certain implementations, the system 100 may further include at least one instance of a sensor 136 and a controller 138 in electrical communication with one another. In addition to being in electrical communication with the sensor 136, the controller 138 may be in electrical communication with at least the actuator 108 and the disengagement mechanism 126 to carry out aspects of the various different deployment techniques described herein. Thus, generally the controller 138 may receive one or more signals from one or more instances of the sensor 136 and, based on the one or more signals from the one or more instances of the sensor 136, the controller 138 may control actuation of the actuator 108 to release of the water-reactive aluminum 118 from the fuel package 106 to start formation of hydrogen-producing gas in the chamber 114 and, further or instead, control actuation of the disengagement mechanism 126 to release the reaction vessel 104 from the inflatable structure 102.

Unless otherwise specified or made clear from the context, the sensor 136 and the controller 138 may be carried along any portion of the system 100 and may remain with either the inflatable structure 102 or the reaction vessel 104 following separation of the inflatable structure 102 from the reaction vessel 104. However, for the sake of clear and efficient description, the sensor 136 and the controller 138 are described as being part of the payload 132, as may be useful for facilitating lightweight and robust electronics packaging and providing recoverable information about deployment of the system 100 following retrieval of the inflatable structure 102. In such instances, one or both of the controller 138 or the sensor 136 may be in mechanical and/or electrical communication with components carried on the inflatable structure 102 via the tether 134.

In some implementations, the sensor 136 may include any one or more of various different types of sensors useful for actuation of the actuator 108 to release the water-reactive aluminum 118 from the fuel package 106 according to the various different techniques described herein. For example, the sensor 136 may be an altitude sensor such that the sensor 136 may provide a signal indicative of the altitude of the inflatable structure 102 at any time following launch of the system 100 from the aircraft 121. To the extent the sensor 136 is carried on the payload 132, it shall be appreciated that the sensor 136 may measure altitude of the payload 132 as a proxy for the altitude of the inflatable structure 102 such that the signal provided by the sensor 136 to the controller 138 is indirectly indicative of the altitude of the inflatable structure 102. Further, or instead, the sensor 136 may include a timer indicative of a time following launch of the system 100 from the aircraft 121.

In certain implementations, the sensor 136 may be a receiver operable to receive a user input signal from a remote user interface 140. The remote user interface 140 may be anywhere in communication with the sensor 136 as the system 100 descends in freefall away from the aircraft 121. Thus, for example, the remote user interface 140 may be on the aircraft 121, where it may be operated by a user (e.g., a user with a visual sightline to the system 100 descending in freefall). Further, or instead, the remote user interface 140 may be on the ground surface S as the system 100 descends in freefall toward the ground surface S.

Figure 3:
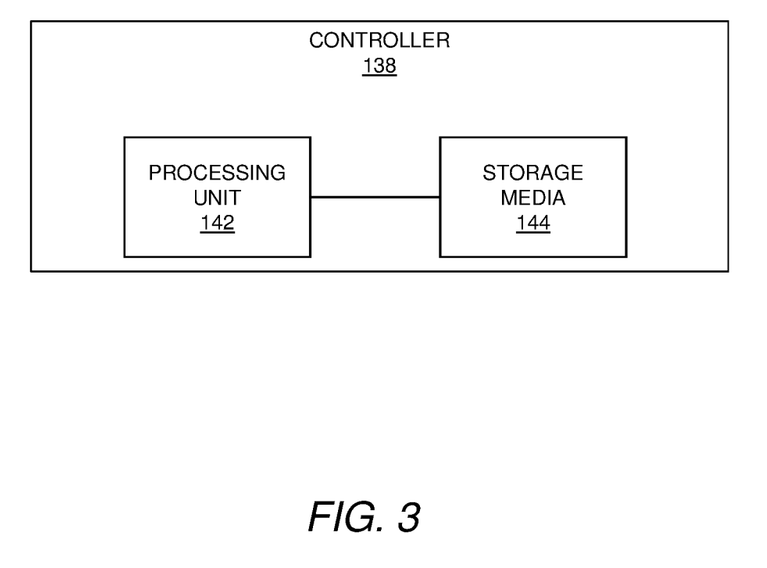
FIG. 3 is a schematic representation of a controller of the system of FIG. 1.

Referring now to FIGS. 1, 2A, and 3, the controller 138 may generally include a processing unit 142 and one or more non-transitory computer storage media 144 in electrical communication with one another. The one or more non-transitory computer storage media 144 may have stored thereon instructions that, when executed by the processing unit 142, cause the processing unit 142 to carry out any one or more of the various different techniques described herein for midair deployment of the inflatable structure 102 in the form of an aerostat. Unless otherwise specified or made clear from the context, it shall be understood that the processing unit 142 and the one or more non-transitory computer storage media 144 may additionally or alternatively carry out mission-specific tasks. However, given that such mission-specific tasks may vary, the description of the processing unit 142 and the one or more non-transitory computer storage media 144 is herein focused on aspects associated with midair deployment of the inflatable structure 102 in an inflated state in the form of an aerostat that may be used to carry out the mission-specific tasks.

Figure 4:
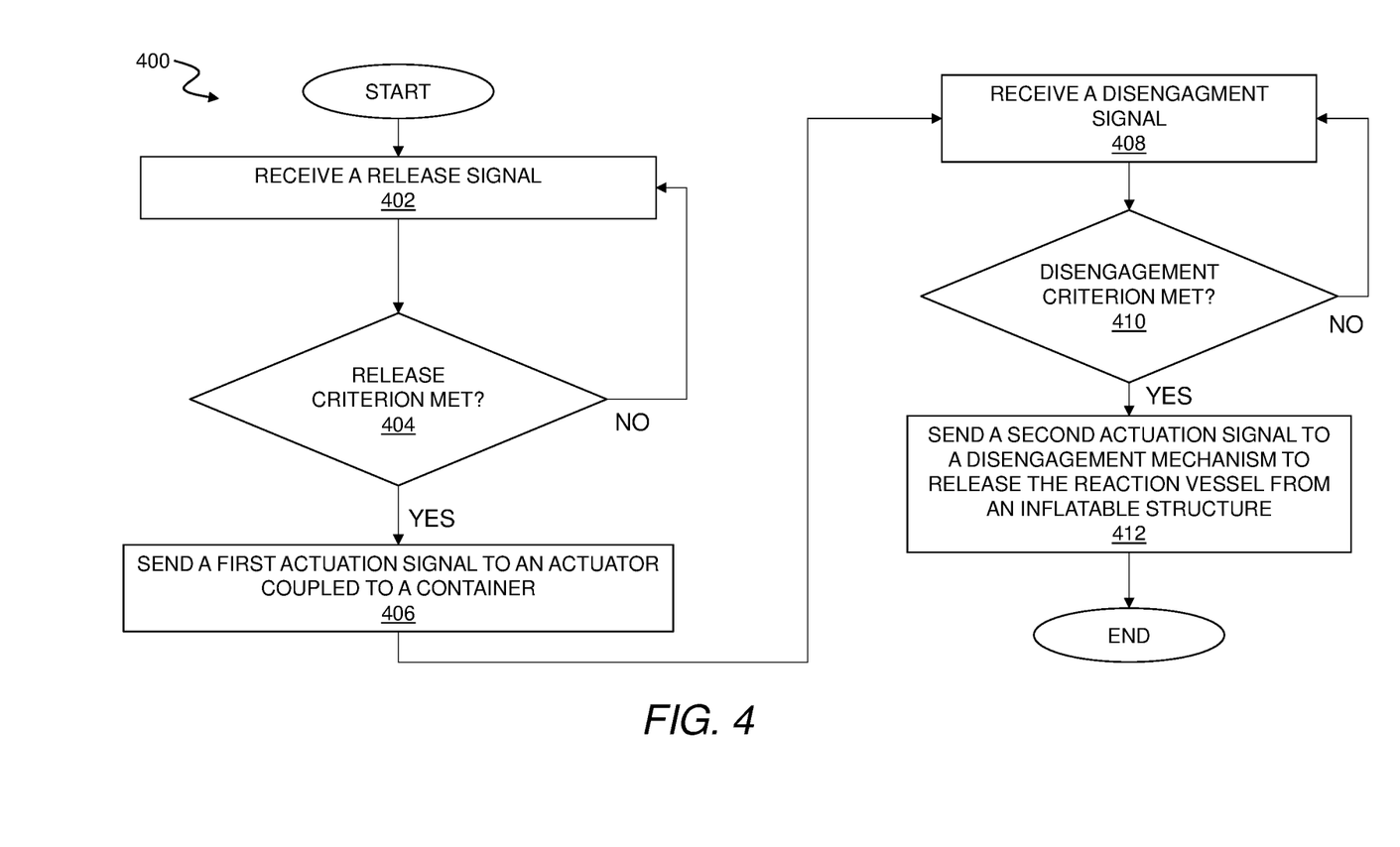
FIG. 4 is a flowchart of an exemplary method of operation a system for midair deployment of an aerostat.

FIG. 4 is a flowchart of an exemplary method 400 of operation a system for midair deployment of an aerostat. Unless otherwise specified or made clear from the context, it shall be understood that any one or more of various different aspects of the exemplary method 400 may be carried out by the controller 138 (FIG. 2A) in electrical communication with one or more instances of the sensor 136 (FIG. 2A), the actuator 108 (FIG. 2A), and the disengagement mechanism 126 (FIG. 2A). For example, the non-transitory computer-readable storage media 144 (FIG. 3) may have stored thereon instructions for causing the processing unit 142 (FIG. 3) to carry out one or more aspects of the exemplary method 400.

As shown in step 402, the exemplary method 400 may include receiving a release signal. The release signal may be received from one or more of the various different types of sensors described herein. Thus, for example, the release signal may include a user input received from a remote user interface. Further, or instead, the release signal may include a sensor signal indicative of altitude of an inflatable structure.

As shown in step 404, the exemplary method 400 may include determining whether the release signal meets a release criterion. For example, the exemplary method 400 may ignore the release signal if an aircraft is too close to the system being deployed, such as may be useful for reducing the likelihood of premature and/or otherwise inadvertent generation of hydrogen-containing gas. Further, or instead, the release criterion may be a predetermined altitude, and the release signal may be continuously compared to the predetermined altitude to determine when to begin generation of hydrogen-containing gas.

As shown in step 406, based on whether the release signal meets the release criterion, the exemplary method 400 may include sending a first actuation signal to an actuator to release water-reactive aluminum from fluidic isolation in a container and into water such that the water-reactive aluminum and water may react in a chamber to form hydrogen-containing gas and heat.

As shown in step 408, following the first signal corresponding to formation of hydrogen-containing gas, the exemplary method 400 may include receiving a disengagement signal. The disengagement signal may directly or indirectly correspond to the progress of formation of the hydrogen-containing gas and heat and inflation of a balloon with the hydrogen-containing gas. For example, the disengagement signal may correspond to a change in altitude of the inflatable structure following initiation of production of hydrogen-containing gas.

As shown in step 410, the exemplary method 400 may include determining whether the disengagement signal meets one or more disengagement criteria. For example, in some instances, the disengagement signal may be a second user input received from a remote user interface, and the determination of whether the disengagement signal is appropriate may be based on distance of the inflatable structure from the aircraft. Further, or instead, in cases in which the disengagement signal is associated with a change in altitude of the inflatable structure, the disengagement criteria may include a predetermined change in altitude corresponding to a minimal amount of buoyancy (e.g., a neutral buoyancy or a positive buoyancy) indicating that the inflatable structure is operating as an aerostat.

As shown in step 412, based on whether the disengagement signal meets the one or more disengagement criteria, the exemplary method 400 may include sending a second actuation signal to a disengagement mechanism to release the reaction vessel from the inflatable structure.

The progress of formation of the hydrogen-containing gas and heat and inflation of a balloon with such hydrogen-containing gas may be tracked as threshold events prior to allowing the exemplary method 400 to progress to disengagement of hardware according to the various different techniques described herein.

Referring now to FIGS. 1 and 2A-2F, having described various aspects of the system 100, attention is now directed to description of exemplary use of various aspects of the system 100 for midair deployment of the inflatable structure 102 as an aerostat. In general, the times used in the description that follows are indicative only of a relative order of steps and, thus, do not represent any particular unit of time and may or may not be uniform relative to one another. That is, the time between any two successive time steps may or may correspond to the time between any other two successive time steps.

Referring now to FIG. 1 and FIG. 2A, at time $t=t_0$, the system 100 may be initially secured to the aircraft 121 via a coupling 146. For example, the system 100 may initially contain only the fuel package 106 with water to be added to the system 100. It shall be appreciated that water may be added at any time prior to releasing the system 100 from the aircraft 121 and, for the sake of illustration, the system 100 is shown coupled to the aircraft 121 without water. However, water may be introduced into the chamber 114 through the port 122 via the hose 124, as described above. While the system 100 is shown as being coupled to the aircraft 121 on the outside of the aircraft 121, it shall be appreciated that the system 100 may be carried inside of the aircraft 121 in certain use cases.

Figure 2B:
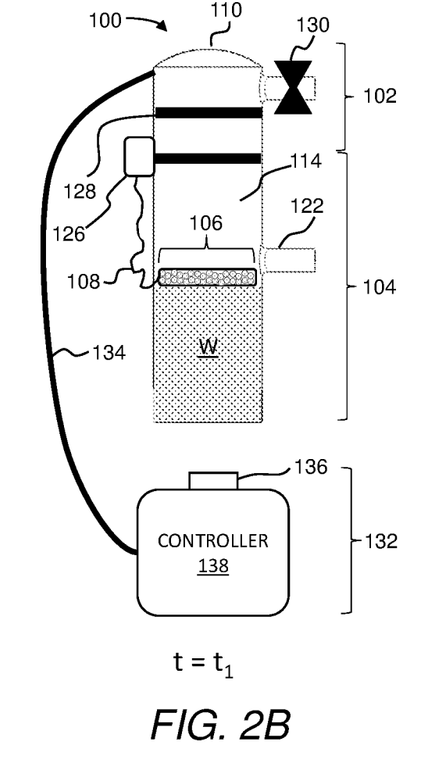
FIG. 2B is an enlarged view of the system of FIG. 1, shown at a first time step ($t=t_1$), in which the chamber defined by the reaction vessel of the system is at least partially filled with water and the water-reactive aluminum in the container is fluidically isolated from the water in the chamber.

Referring now to FIG. 1 and FIG. 2B, at time $t=t_1$, the system 100 carrying the fuel package 106 and water W may be launched from the aircraft 121. Such that the system 100 may freefall away from the aircraft 121. As the system 100 freefalls, the water-reactive aluminum 118 in the container 116 of the fuel package 106 may be fluidically isolated from the water W such that production of the hydrogen-containing gas is not yet initiated.

Figure 2C:
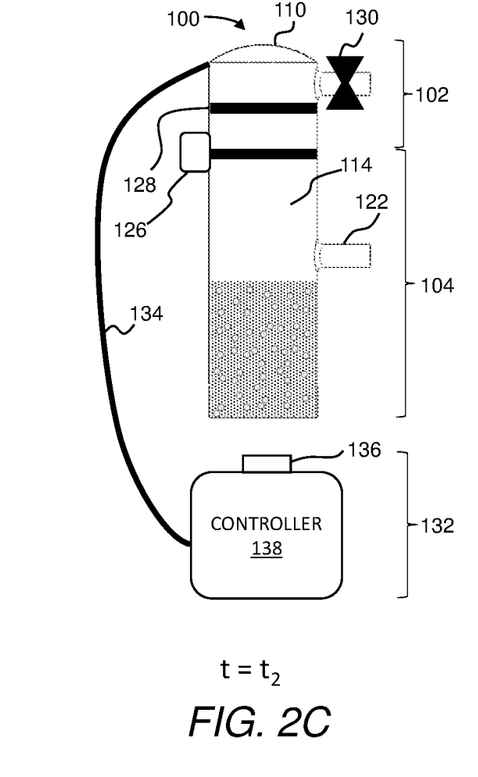
FIG. 2C is an enlarged view of the system of FIG. 1, shown at a second time step ($t=t_2$), in which the water-reactive aluminum is initially released from the container and into the water in the chamber.

Referring now to FIG. 1 and FIG. 2C, at time $t=t_2$, the actuator 108 may be actuated to release the fluidic isolation between the water-reactive aluminum 118 and the water W in the chamber 114 to generate the hydrogen-containing gas useful for providing lift. The actuation of the actuator 108 to release of fluidic isolation between the water-reactive aluminum 118 and water W in the chamber 114 may be based on any one or more of various different criteria described herein, including one or more of the following: altitude of the inflatable structure; a predetermined time following launch of the inflatable structure from the aircraft; or a remote signal from a user at a remote user interface. Further, while it may be advantageous to wait to release the water-reactive aluminum 118 into the water W, it shall be appreciated that the state of the system 100 at $t=t_2$ may be combined with the state of the system 100 at $t=t_0$ and $t=t_1$ such that production of the hydrogen-containing gas may be initiated while the system 100 just prior to release of the system 100 from the aircraft 121, as may be useful for launching the aircraft 121 at lower altitude. It shall be further appreciated that these steps are depicted separately to facilitate clear and efficient description of these steps.

Figure 2D:
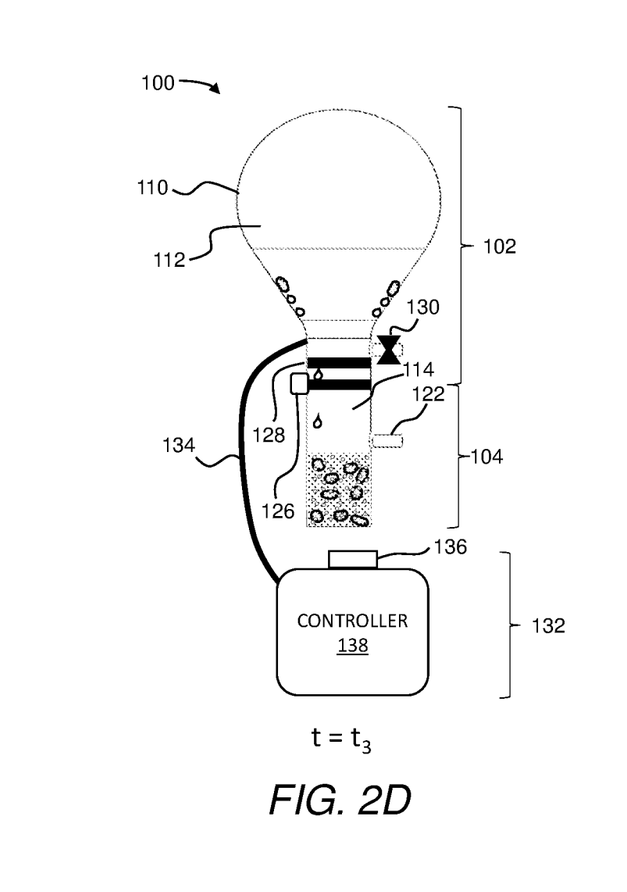
FIG. 2D is an enlarged view of the system of FIG. 1, shown at a third time step ($t=t_3$), in which the reaction of the water-reactive aluminum in water in the container produces hydrogen-containing gas that flows from the chamber of the reaction vessel and into a volume at least partially defined by a balloon of the inflatable structure of the system.

Referring now to FIG. 1 and FIG. 2D, at time $t=t_3$, the hydrogen-containing gas formed in the chamber 114 may be directed from the chamber 114 into the volume 112 of the balloon 110 to inflate the balloon 110. As the hydrogen-containing gas cools in the volume 112 of the balloon 110, condensed moisture may flow from the volume 112 of the balloon 110 back into the chamber 114 to react with any remaining unreacted quantities of the water-reactive aluminum 118 in the chamber 114. The water W and the water-reactive aluminum 118 may be present in an initial mass ratio of 3:1 to 6:1, and even if the reaction does not proceed to completion, sufficient hydrogen-containing gas may be generated by overdriving the reaction to generate less steam, reduce system weight, and allow the reaction to proceed rapidly due to less liquid water that is able to take away heat from the reaction.

Figure 2E:
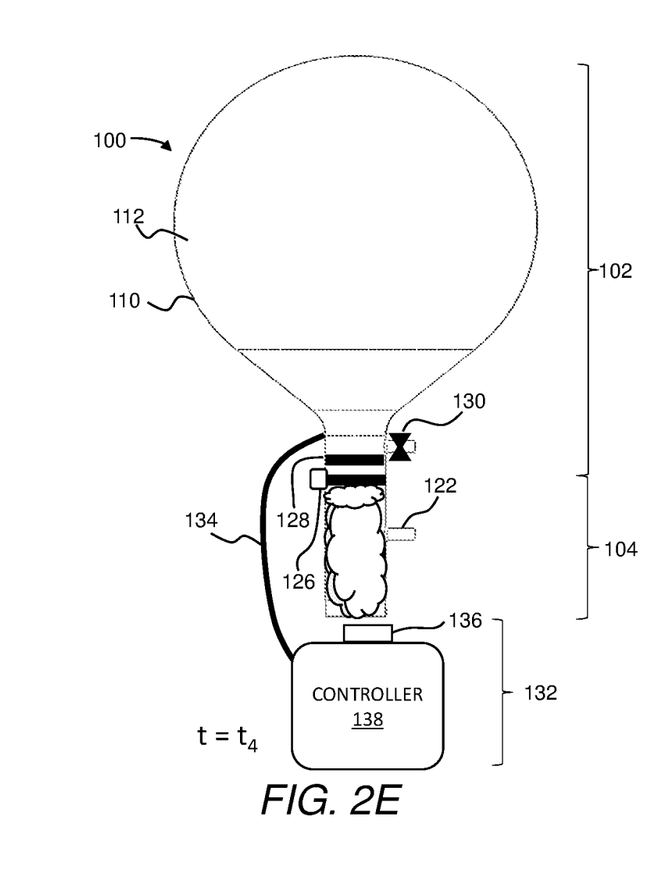
FIG. 2E is an enlarged view of the system of FIG. 1, shown at a fourth time step ($t=t_4$), in which hydrogen-containing gas in the volume of the balloon floats the inflatable structure as an aerostat and byproducts of the reaction between the water reactive aluminum and water remain in the chamber of the reaction vessel.

Referring now to FIG. 1 and FIG. 2E, at time $t=t_4$, the reaction of the water-reactive aluminum 118 in the chamber 114 may be complete (e.g., achieving a hydrogen yield of greater than 80 percent) or nearly complete, and the system 100 may have neutral or positive buoyancy such that the inflatable structure 102 is an aerostat. At this point, chamber 114 may contain nothing but aluminum hydroxide 14, and in some scenarios leftover unreacted quantity of the water-reactive aluminum 118 or residual from condensation. If the reaction is done with a low concentration of water (4:1 water:water-reactive aluminum mass ratio), there may be some unreacted quantity of water-reactive aluminum. However, this may be desirable as running such a low water:water-reactive aluminum mass ratio produces more hydrogen gas than steam as a result of the limited supply of water and the speed of the reaction. This may be advantageous for achieving weight savings weight and faster deployment of the inflatable structure 102 as an aerostat. At this point, approximately 3-7 minutes after deployment, the system 100 has reached a steady state and the inflatable structure 102 and the payload 132 are ready to be separated from the reaction vessel 104.

Figure 2F:
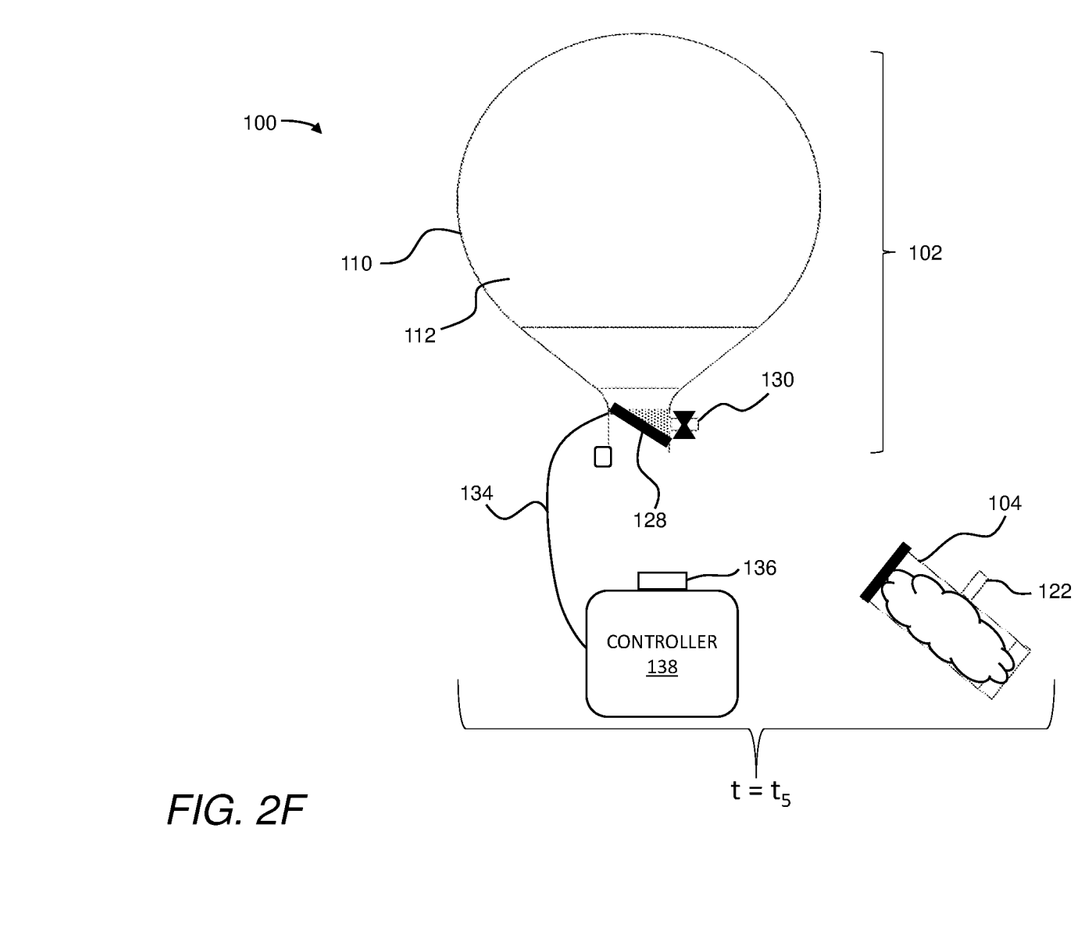
FIG. 2F is an enlarged view of the system of FIG. 1, shown at a fifth time step ($t=t_5$) in which the reaction vessel is released from the inflatable structure, with the reaction vessel descending as inflatable structure floats in air as an aerostat.

Referring now to FIG. 1 and FIG. 2F, with the inflatable structure 102 having neutral or positive buoyancy, the disengagement mechanism 126 may be actuated to detach the inflatable structure 102 from the reaction vessel 104, thus allowing the inflatable structure 102 and the payload 132 to continue floating (e.g., to rise) to carry out one or more mission tasks while the reaction vessel 104 may fall toward the ground surface S. With the reaction vessel 104 detached from the inflatable structure 102, the bistable valve 128 may move to a closed position to seal the volume 112.

As the hydrogen-containing gas in the volume 112 continues to cool following sealing of the volume 112 by the bistable valve 128. Condensation may collect near the bottom of the volume 112. The drainage valve 130 may be selectively actuated to release the condensation, as may be useful to achieve higher and/or longer flight of the inflatable structure 102 operating as an aerostat carrying the payload 132.

Having described various aspects of the system 100 and exemplary operation of the system 100, attention is now directed to discussion of calculated relationships between various parameters useful for sizing and using the system 100. Unless otherwise specified or made clear from the context, the relationships discussed below shall be understood to be applicable to various different aspects of the system 100.

The scenario presented in Table 1 is of a 12 kg aluminum reaction conducted in the system at 6000 m, inflating a large balloon, which it uses to slow the system down without a parachute. If a wind is blowing upwards at the system with a velocity of 19.65 m/s, the system may slow down and eventually begin to rise due to the drag forces generated by the balloon. Thus, a system may be jettisoned from an aircraft, and then rapidly deployed, slow itself down, cut away the reaction products used to generate the gas, and then begin to rise throughout the atmosphere with a payload attached and be able to control its own ballast with the condensed steam from the reaction and gas contained inside the inflatable structure.

A key metric is the total weight of the system: water-reactive aluminum (referred to below as aluminum fuel) and water to yield a net amount of hydrogen, while minimizing steam volume to reduce demands on the balloon. When comparing the weight of reactant systems using different ratios of water to fuel, steam is still capable of reacting with the aluminum fuel. Thus, if only 50% of the needed water is present to dissipate the heat, the reaction can still proceed past 50% because the gaseous water reacts with the fine particulate aluminum fuel, reacting further. Through testing, it has been observed a 4:1 (water:aluminum fuel mass ratio) reaction produced approximately 70% of hydrogen yield, while at least a 6:1 (water:aluminum fuel mass ratio) reaction is necessary to have sufficient water for the reaction to proceed fully to about 98% of hydrogen yield. Without having to depend on steam or condensate, a 2:1 (water:aluminum fuel mass ratio) is the minimum by stoichiometry. Thus, using a linear interpolation, one would expect only 50% hydrogen yield to be generated from the 4:1 experiment. The observation of 70% hydrogen yield in the 4:1 experiment suggests that there is not a linear relationship between reactant mass ratios and hydrogen yield below the minimum (6:1) to achieve a complete reaction. As a result, this non-linearity can be used to reduce the mass of the system by reducing the amount of water required without sacrificing an equal amount of performance of the system due to the likely reaction of gaseous steam with aluminum fuel to generate hydrogen gas, heat, and an aluminum hydroxide/oxide species.

TABLE 1

Exemplary calculation drag force and minimum air velocity needed to slow down a monolithic hydrogen generation system.

| Term | Symbol | Value | Units | Formulas |
|---|---|---|---|---|
| Reaction Sizing | | | | |
| Aluminum Fuel Mass* | m_fuel | 12000 | g | |
| Water:Aluminum Ratio* | ratio_w | 6 | | |
| Aluminum Fuel Ga-In percentage* | Ga_percentage | 4 | % | |
| Pure Aluminum Mass | m_al | 11520 | g | (1-(Ga_percentage/100))*m_fuel |
| Hydrogen Mass | m_h2 | 1291 | g | m_al/26.9815/2*3*2.01568 |
| Air temperature* | t_air | 20 | C. | |
| Volume of H2 at 0 Celsius | v_h2cold | 14346 | L | m_h2/2.01568*22.4 |
| Volume of H2 at Air Temperature | v_h2amb | 15408 | L | v_h2cold*(T_air+270)/270 |
| Water Mass | m_water | 69120 | g | ratio_w * m_al |
| Water Consumed by Reaction | m_watercon | 23040 | g | m_al*2 |
| Remaining Water for Cooling | m_waterrem | 46080 | g | m_water - m_watercon |
| Steam volume per Liter of Water* | rho_steam | 1.673 | Liters/g | |
| Total Steam volume Generated | v_steam | 77092 | Liters | rho_steam*m_waterrem |
| Total Volume of Gas Generated | v_gastotal | 93 | m^3 | (v_steam + v_h2amb)/1000 |
| | | 92500 | Liters | v_gastotal*1000 |
| Radius of Balloon Required to hold Reaction gas (H2 and steam) | r_rxnballoon | 2.81 | m | (v_gastotal*3/(4*PI( )))^(1/3) |
| | | 110 | inches | r_rxnballoon * 39 |
| Radius of Balloon to hold just H2 | r_liftballoon | 1.54 | m | (v_h2amb/1000*3/(4*PI( )))^(1/3) |
| | | 60.2 | inches | r_liftballoon * 39 |
| Reactants Mass | m_reactants | 81 | kg | (m_fuel + m_water)/1000 |
| Payload Mass* | m_payload | 15 | kg | |
| Component mass* | m_components | 15 | kg | |
| Total System mass | m_system | 111 | kg | m_reactants + m_payload + m_components |
| Drag on Balloon | | | | |
| Altitude of Deployment* | h_deploy | 6000 | m | |
| | | 19685 | ft | h_deploy/0.3048 |
| | T_deploy | -23.9 | C. | 15.04-0.00649*h_deploy |
| Pressure at Altitude | P_deploy | 47274 | Pa | 101.29*( (T_deploy+273.1)/288.08)^(5.256)* 1000 |
| Air Pressure at Sea Level* | Pair_sea | 101300 | Pa | |
| Density of Air at Sea Level* | rho_sea | 1.225 | kg/m^3 | |
| Gas Constant for Air* | R_air | 287 | J/kg-K | |
| Density of Air at Altitude* | rho_deploy | 0.67 | kg/m^3 | |
| Gravitational Force from System | Fg_system | 1089 | N | m_system*9.8 |

TABLE 1-continued

Exemplary calculation drag force and minimum air velocity
needed to slow down a monolithic hydrogen generation system.

| Term | Symbol | Value | Units | Formulas |
|---|---|---|---|---|
| Total Gas Volume at 20k Feet | v_gastotal20k | 168.2 | m^3 | v_gastotal*Pair_sea*(T_deploy+270)/((T_air+270)*P_deploy) |
| Radius of Balloon Required to hold Reaction Gas at Altitude | r_rxnballoon | 3.42 | m | (v_gastotal20K*3/(4 * PI( )))^(1/3) |
|  |  | 134 | inches | r_rxnballoon*39 |
| Projected Area | A_proj | 9.2 | m^2 | r_rxnballoon^2*PI( )/4 |
| Coefficient of Drag for a Sphere* | Cd_sphere | 0.5 |  |  |
| Max Wind Velocity Needed to make system Neutrally buoyant | V_drag | 19.65 | m/s | SQRT(Fg_system*2/(rho_sea*Cd_sphere*A_proj)) |
| *Input | parameter |  |  |  |

Table 2 shows calculations four scenarios with different water:aluminum fuel mass ratios to generate lifting gas for a modest size balloon (10 m$^3$). A 4:1 system is calculated to require only 53.6 kg of reactants to produce the equivalent amount of dry hydrogen gas as a 6:1 system which is calculated to require 70 kg of reactants. In addition, the 4:1 system creates 20 cubic meters less steam. This reduces demands on the balloon to be able to expand, making the system ultimately less dangerous due to the amount of gas generated initially by reducing the severity of sudden pressurizations simply because there is less gas may be generated initially. Additionally, since flight applications are highly sensitive to mass, the aluminum fuel may not be fully reacted in the reaction vessel, even though sufficient lifting gas has been generated. Thus, when the reaction vessel is separated from the inflatable structure, the aluminum fuel may simply fall back to earth and react slowly and innocuously in the terrestrial environment.

TABLE 2

Reactant mass for different mass ratios of water to activated fuel

|  | Scenario A | Scenario B | Scenario C | Scenario D |
|---|---|---|---|---|
| Mass of Aluminum Fuel (kg)* | 10 | 10 | 10 | 10 |
| Mass Ratio of Water: Aluminum Fuel* | 4 | 5 | 6 | 10 |
| Mass of Water (kg) | 40 | 50 | 60 | 100 |
| Completion %* | 70% | 80% | 95% | 97% |
| Hydrogen gas Volume (m^3) | 8.4 | 9.6 | 11.4 | 11.64 |
| H2/steam ratio | 1.05 | 0.53 | 0.41 | 0.17 |
| Net Reactant Mass (kg) | 50 | 60 | 70 | 110 |
| Necessary Mass of Al to Produce Equal H2 to Scenario C | 13.6 | 11.9 | 10 | 9.8 |
| Weighted Net Reactant Mass (kg) | 53.6 | 61.9 | 70.0 | 109.8 |

*Input parameter

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for midair deployment of an aerostat, the system comprising:
   an inflatable structure including a balloon and a valve, the balloon at least partially defining a volume, and the valve movable from an open position to a closed position;
   a reaction vessel defining a chamber in fluid communication with the volume, the chamber at least partially fillable with a reactant;
   a fuel package disposed adjacent the chamber, the fuel package including a container and water-reactive aluminum, the container fluidically isolating the water-reactive aluminum from the chamber; and
   an actuator actuatable in midair, away from an aircraft launching the system, to release the water-reactive aluminum from the container into the chamber such that the water-reactive aluminum is reactive with the reactant in the chamber to generate a hydrogen-containing lifting gas directable into the volume via the valve in the open position.

2. The system of claim 1, wherein at least a portion of the container is pierceable, via actuation of the actuator, to release the water-reactive aluminum from the container to react with the reactant in the chamber.

3. The system of claim 1, wherein at least a portion of the container is thermally weakenable, via actuation of the actuator, to release the water-reactive aluminum from the container to react with the reactant in the chamber.

4. The system of claim 1, further comprising a disengagement mechanism, wherein the disengagement mechanism is disposed between the reaction vessel and the inflatable structure, the valve is a bistable valve, the disengagement mechanism is actuatable to separate the inflatable structure from the reaction vessel, and the bistable valve is movable to seal the volume of the balloon in coordination with actuation of the disengagement mechanism.

5. The system of claim 4, wherein at least a portion of the reaction vessel is open following separation of the reaction vessel from the inflatable structure.

6. The system of claim 1, wherein the reaction vessel defines a port in fluid communication with the chamber.

7. The system of claim 6, wherein the fuel package is introducible into the chamber via the port.

8. The system of claim 1, wherein the water-reactive aluminum includes sand-sized particles.

9. The system of claim 8, wherein the sand-sized particles have a particle size distribution with a predetermined lower threshold and a predetermined upper threshold.

10. The system of claim 9, wherein the predetermined lower threshold is 0.07 mm, and the predetermined upper threshold is 2 mm.

11. A method of deploying an aerostat in midair, the method comprising:
    launching, from an aircraft in flight, an inflatable structure coupled to a reaction vessel;
    in a chamber defined by the reaction vessel, releasing fluidic isolation between water-reactive aluminum and water in the chamber to generate a hydrogen-containing lifting gas;
    directing the hydrogen-containing lifting gas from the chamber into a volume at least partially defined by a balloon of the inflatable structure; and
    with the hydrogen-containing lifting gas at least partially filling the volume of the balloon to provide buoyancy, detaching the inflatable structure from the reaction vessel.

12. The method of claim 11, wherein launching the inflatable structure and the reaction vessel from the aircraft in flight includes dropping the inflatable structure and the reaction vessel into freefall from the aircraft.

13. The method of claim 11, wherein releasing fluidic isolation between the water-reactive aluminum and the water is based on altitude of the inflatable structure and the reaction vessel.

14. The method of claim 11, wherein releasing fluidic isolation between the water-reactive aluminum and the water in the chamber is based on a predetermined time following launch of the inflatable structure and the reaction vessel from the aircraft.

15. The method of claim 11, wherein releasing fluidic isolation between the water-reactive aluminum and the water in the chamber is based on a remote signal from a user.

16. The method of claim 11, wherein releasing fluidic isolation between the water-reactive aluminum and the water in the chamber is based on buoyancy of the inflatable structure.

* * * * *